(12) United States Patent
Oh

(10) Patent No.: US 9,820,186 B2
(45) Date of Patent: Nov. 14, 2017

(54) COMMUNICATION MODULE AND DATA SEGMENTATION TRANSMISSION METHOD USING THE SAME

(71) Applicant: LG INNOTEK CO., LTD., Seoul (KR)

(72) Inventor: Yong Taek Oh, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 15/302,369

(22) PCT Filed: Apr. 6, 2015

(86) PCT No.: PCT/KR2015/003406
§ 371 (c)(1),
(2) Date: Oct. 6, 2016

(87) PCT Pub. No.: WO2015/156550
PCT Pub. Date: Oct. 15, 2015

(65) Prior Publication Data
US 2017/0026873 A1 Jan. 26, 2017

(30) Foreign Application Priority Data
Apr. 7, 2014 (KR) .................. 10-2014-0041185

(51) Int. Cl.
*H04B 13/02* (2006.01)
*H04B 5/00* (2006.01)
(Continued)

(52) U.S. Cl.
CPC ........... *H04W 28/06* (2013.01); *H04W 4/16* (2013.01); *H04W 88/04* (2013.01); *H04W 4/008* (2013.01)

(58) Field of Classification Search
CPC ........................... H04W 28/06; H04W 28/065
(Continued)

(56) References Cited

U.S. PATENT DOCUMENTS 9,046,926 B2 * 6/2015 Mohammed ............ G06F 3/016
9,286,005 B2 * 3/2016 Lu ........................ H04M 1/7253
(Continued)

FOREIGN PATENT DOCUMENTS

| KR | 10-0832805 B1 | 5/2008 |
| KR | 10-2009-0038204 A | 4/2009 |
| KR | 10-2013-0115325 A | 10/2013 |

*Primary Examiner* — Tilahun B Gesesse
(74) *Attorney, Agent, or Firm* — Birch, Stewart, Kolasch & Birch, LLP

(57) ABSTRACT

Provided are a communication module and a data segmentation transmission method using the same. The communication module includes a communication unit configured to support a wireless connection with a communication terminal, a control unit configured to segment data, which is received from the communication terminal supported in connection thereof, based on a first scale, and to transmit the segmented data to a driver information system (DIS), and a signal generation unit configured to, upon receiving an interrupt signal from the communication terminal, generate a connection signal to the DIS, wherein the control unit segments data, which is received from the communication terminal during an interval in which the connection signal is generated, based on a second scale, and transmits the segmented data to the DIS.

20 Claims, 2 Drawing Sheets

(51) Int. Cl.
    *H04B 7/00*     (2006.01)
    *H04B 1/00*     (2006.01)
    *H04W 28/06*     (2009.01)
    *H04W 4/16*     (2009.01)
    *H04W 88/04*     (2009.01)
    *H04W 4/00*     (2009.01)

(58) Field of Classification Search
    USPC .............................................. 455/41.2, 41.1
    See application file for complete search history.

(56) References Cited

U.S. PATENT DOCUMENTS

| | | | |
|---|---|---|---|
| 2009/0096711 A1 | 4/2009 | Jang et al. | |
| 2009/0298536 A1* | 12/2009 | Ikeda | G01C 22/006 |
| | | | 455/556.1 |
| 2010/0076670 A1 | 3/2010 | Turner et al. | |
| 2012/0242687 A1 | 9/2012 | Choi | |
| 2013/0050271 A1 | 2/2013 | Kim et al. | |
| 2016/0019021 A1* | 1/2016 | Lu | H04M 1/7253 |
| | | | 700/94 |

\* cited by examiner

COMMUNICATION MODULE AND DATA SEGMENTATION TRANSMISSION METHOD USING THE SAME

CROSS REFERENCE TO RELATED APPLICATIONS

This application is the National Phase of PCT International Application No. PCT/KR2015/003406, filed on Apr. 6, 2015, which claims priority under 35 U.S.C. 119(a) to Patent Application No. 10-2014-0041185, filed in Republic of Korean on Apr. 7, 2014, all of which are hereby expressly incorporated by reference into the present application.

BACKGROUND

1. Field of the Disclosure

The present invention relates to a communication module and a data segmentation transmission method using the same, and more particularly, to a communication module capable of performing a data communication between a communication terminal and a driver information system (DIS) and a data segmentation transmission method using the same.

2. Discussion of Related Art

A near field communication (NFC) is a communication method in which a plurality of communication devices located within a near field are connected through a wireless network and a bidirectional real time communication between the devices is established without having a complicated wiring connecting between the devices.

When there is a need for a signal transmission between communication devices at home or office, the NFC allows a direct wireless communication between communication devices without passing through a base station at a distant range and thus a communication load is prevented from being applied to the base station.

Among the NFC communication methods, Bluetooth communication, which enables a high speed data transmission, is used for a communication between a portable terminal and a vehicle system. In particular, Bluetooth have been recently used to provide various functions in which a vehicle system receives multimedia content located in a portable terminal in a wireless manner and the received multimedia content is played, a user makes a call through a speaker and a microphone equipped in the vehicle, or phone book data stored in a portable terminal is transmitted to a vehicle system so that upon receiving an incoming call, relevant information is displayed in connection with the portable terminal.

The vehicle system performs a data communication with the portable terminal through a Bluetooth module, and according to a request by a user, receives various pieces of data including a phone book from the portable terminal. In this case, the Bluetooth module, while transmitting the data received from the portable terminal to the vehicle system, serves to create a ring tone and outputs the created ring tone to the vehicle system. However, when the data scale is large and the transmission of data is simultaneously performed with the creation of a ring tone, severe distortion may occur in the ring tone, such as elongation or break of the ring tone.

SUMMARY OF THE DISCLOSURE

The present invention is directed to providing technology for a communication module capable of performing a data communication between a communication terminal and a driver information system (DIS) according to a profile provided by the communication terminal, and performing a data segmentation transmission to prevent distortion of a connection signal when the communication module receives an incoming call signal, and a data segmentation transmission method using the same.

The technical objectives of the present invention are not limited to the above disclosure; other objectives may become apparent to those of ordinary skill in the art based on the following descriptions.

According to an aspect of the present invention, there is provided a communication module including a communication unit, a control unit, and a signal generation unit. The communication unit may be configured to support a wireless connection with a communication terminal. The control unit may be configured to segment data, which is received from the communication terminal supported in connection thereof, based on a first scale, and to transmit the segmented data to a driver information system (DIS). The signal generation unit may be configured to, upon receiving an interrupt signal from the communication terminal, generate a connection signal to the DIS. The control unit segments data, which is received from the communication terminal during an interval in which the connection signal is generated, based on a second scale, and transmits the segmented data to the DIS The second scale may be set to be smaller than the first scale.

A relation in size between the first scale and the second scale may be set according to a type of the data and a degree of distortion of the connection signal.

The connection signal may be a ring tone.

The profile may include at least one of HFP (Hands Free Profile), A2DP (Advanced Audio Distribution Profile), AVRCP (Audio Video Remote Control Profile), PBAP (Phone Book Access Profile), and SPP (Serial Port Profile).

The control unit may receive at least one of a text, an image, and acoustic data from the communication terminal according the SPP, and segment and transmit the received at least one of a text, an image, and acoustic data to the DIS.

The control unit may receive phone book data from the communication terminal according to the PBAP, and segment and transmit the received phone book data to the DIS.

The signal generation unit may generate a connection signal to the DIS by using at least one of a PCM interface, an I2S interface, and an analog interface.

The communication unit may support a wireless connection with the communication terminal by using at least one communication mode of Bluetooth, ZigBee, ISA-100, and WirelessHART.

According to another aspect of the present invention, there is provided a data segmentation transmission method performed by a communication module, which includes: supporting a wireless connection with a communication terminal; by a control unit, segmenting data, which is received from the communication terminal supported in connection thereof, based on a first scale, and transmitting the segmented data to a driver information system (DIS); by a signal generation unit, upon receiving an interrupt signal from the communication terminal, generating a connection signal to the DIS; and by the control unit, segmenting data, which is received from the communication terminal during an interval in which the connection signal is generated, based on a second scale, and transmitting the segmented data to the DIS The data segmentation transmission method may further include, by the control unit, segmenting data, which is received at a point of time when the generation of the connection signal is terminated, based on the first scale, and transmitting the segmented data to the DIS.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
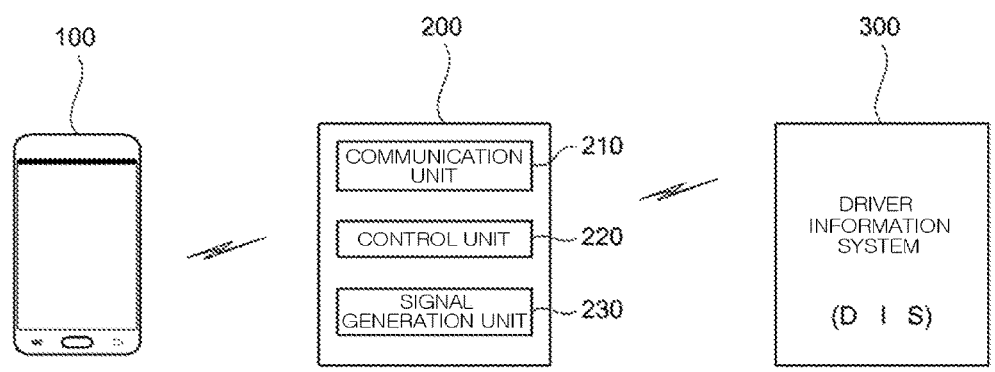
FIG. 1 is a block diagram illustrating a configuration of a communication module according to an embodiment of the present invention.

Example embodiments of the present invention are disclosed herein. However, example embodiments of the present invention may be embodied in many alternate forms and should not be construed as limited to example embodiments of the present invention set forth herein. Accordingly, while the present invention is susceptible to various modifications and alternative forms, specific embodiments thereof are shown by way of example in the drawings, and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings. The same reference numerals are used to designate the same elements throughout the drawings. Descriptions of well-known functions and structures will be omitted to enhance clarity and conciseness.

FIG. 1 is a block diagram illustrating a configuration of a communication module according to an embodiment of the present invention.

Referring to FIG. 1, a communication module 200 according to an embodiment of the present invention is installed in a vehicle to perform a data communication between a communication terminal 100 and a driver information system (DIS) 300.

The communication terminal 100 may be implemented as an external device, such as a smart phone, a PDA, and an MP3 player, that may support a message transmission/reception function and a voice/video call function in a predetermined communication mode.

The DIS 300 may perform not only multimedia functions, such as an Audio/Video (AV) function, a car audio function, telematics function, but also vehicle controls involving an air conditioner, settings of a vehicle under a body control, and self-diagnosis via a network communication in a vehicle.

The DIS 300 may receive data from the communication terminal 100 through the communication module 200, and the received data is temporality stored in a flash memory and then is stored in a database.

The DIS 300 according to the present invention is regarded as falling within a comprehensive concept of the present invention including a unified multimedia device provided for convenience of a driver and a system device in a vehicle configured to receive data from a communication terminal and store the received data therein, for example, a single car audio device or a voice navigation device that does not require a display.

The communication module 200 may include a communication unit 210, a control unit 220, and a signal generation unit 230.

The communication unit 210 may support a wireless connection with the communication terminal 100 according to a profile provided by the communication terminal 100. The communication unit 210 establishes a pairing with the communication terminal 100 provided outside of the communication unit 210 through a predetermined pairing process. In this case, depending on a profile provided by the communication terminal 100, a function provided by the DIS 300 may be changed through the communication module 200. For example, a HFP (Hands Free Profile) provides a call function, an A2DP (Advanced Audio Distribution Profile) provides a stereo sound service, an AVRCP (Audio Video Remote Control Profile) provides a control function of a communication terminal, a PBAP (Phone Book Access Profile) provides a phone book download function, and a SPP (Serial Port Profile) provides a transmission/reception function of various texts, images and acoustic data with respect to the communication terminal.

The communication unit 210 supports a wireless communication connection with the communication terminal 100 by using a near field wireless communication mode that is supportable by the communication terminal 100, for example, any one of Bluetooth, ZigBee, ISA-100, and WirelessHART communication modes.

The control unit 220 may segment data, which is received from the communication terminal 100 supported in connection thereof, based on a first scale, and transmit the segmented data to the DIS 300. When the communication terminal 100 receives an interrupt signal in the middle of the segmenting and transmitting of data based on the first scale and the signal generation unit 230 generates a connection signal the control unit 220 is configured to, during an interval in which the connection signal is generated, segment data based on a second scale and transmit the segmented data to the DIS 300. In this case, the second scale may be set to be smaller than the first scale.

The control unit 220 may set a relation in size between the first scale and the second scale according to at least one of a type of the profile, a size of data, and a type of data.

In addition, the control unit 220 may resize the second scale according to a degree of distortion of the connection signal. For example, the control unit 220, segmenting data at a segmentation ratio of 20% corresponding to the first scale at a point of time when an initial interrupt signal is generated, and may segment data at segmentation ratios that may gradually decrease, for example, at a segmentation ratio of 10% and then at a segmentation ratio of 5% when the degree of distortion of data is significantly high.

The connection signal generated by the signal generation unit 230 may be an interrupt signal according to an incoming call signal, for example, a ring tone generated by the signal generation unit 230.

The data transmitted from the communication terminal 100 may be varied depending on the profile provided by the communication terminal 100. That is, according to the SPP, the communication terminal 100 may transmit various types of texts, images, and acoustic data to the communication module 200, and according to the PBAP, the communication terminal 100 may transmit phone book data to the communication module 200.

The control unit 220 may change a segmentation and transmission scale for each data received from the communication terminal 100 and transmitted to the DIS 300 based on an interval in which a connection signal is generated.

In this case, the first scale and the second scale may be determined to have a size relation therebetween based on the size of data transmitted from the communication terminal 100 such that a connection signal generated to the DIS 300 is prevented from having a distortion.

Figure 2:
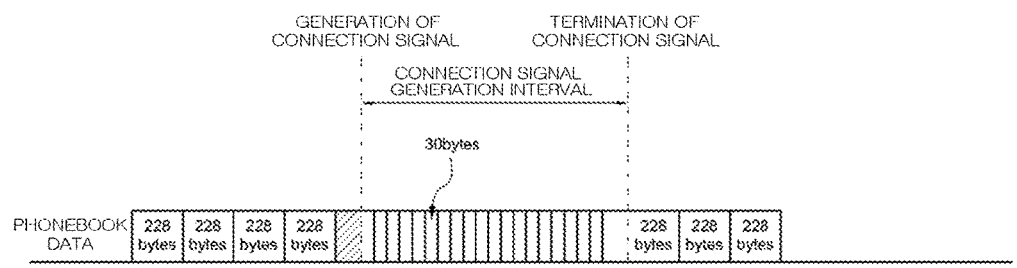
FIG. 2 is a conceptual diagram for describing a data segmentation transmission of a communication module according to an embodiment of the present invention.

FIG. 2 is a conceptual diagram for describing a data segmentation and transmission of a communication module according to an embodiment of the present invention.

Referring to FIG. 2, as for transmission of phone book data, the phone book data is segmented and transmitted in 228 bytes, that is, the maximum transmission scale during an interval in which a connection signal is not generated, and from an interval in which a connection signal is generated, the phone book data is segmented and transmitted in 30 bytes. When a data packet (a shaded block), which has been segmented and transmitted in 228 bytes, is provided at a boundary of an interval from which a segmentation scale is changed to 30 bytes due to occurrence of a connection signal generated, the whole data packet is newly segmented in 30 bytes (a second scale), and is transmitted. The first scale and the second scale are determined in consideration of a size of data, a degree of distortion of a connection signal, and so on, and the present invention is not limited thereto.

The signal generation unit 230, upon receiving an incoming call signal from the communication terminal 100, may output a connection signal to the DIS 300. The signal generation unit 230 may output the connection signal to the DIS 300 by using at least one of a PCM interface, an I2S interface, and an analog interface.

Figure 3:
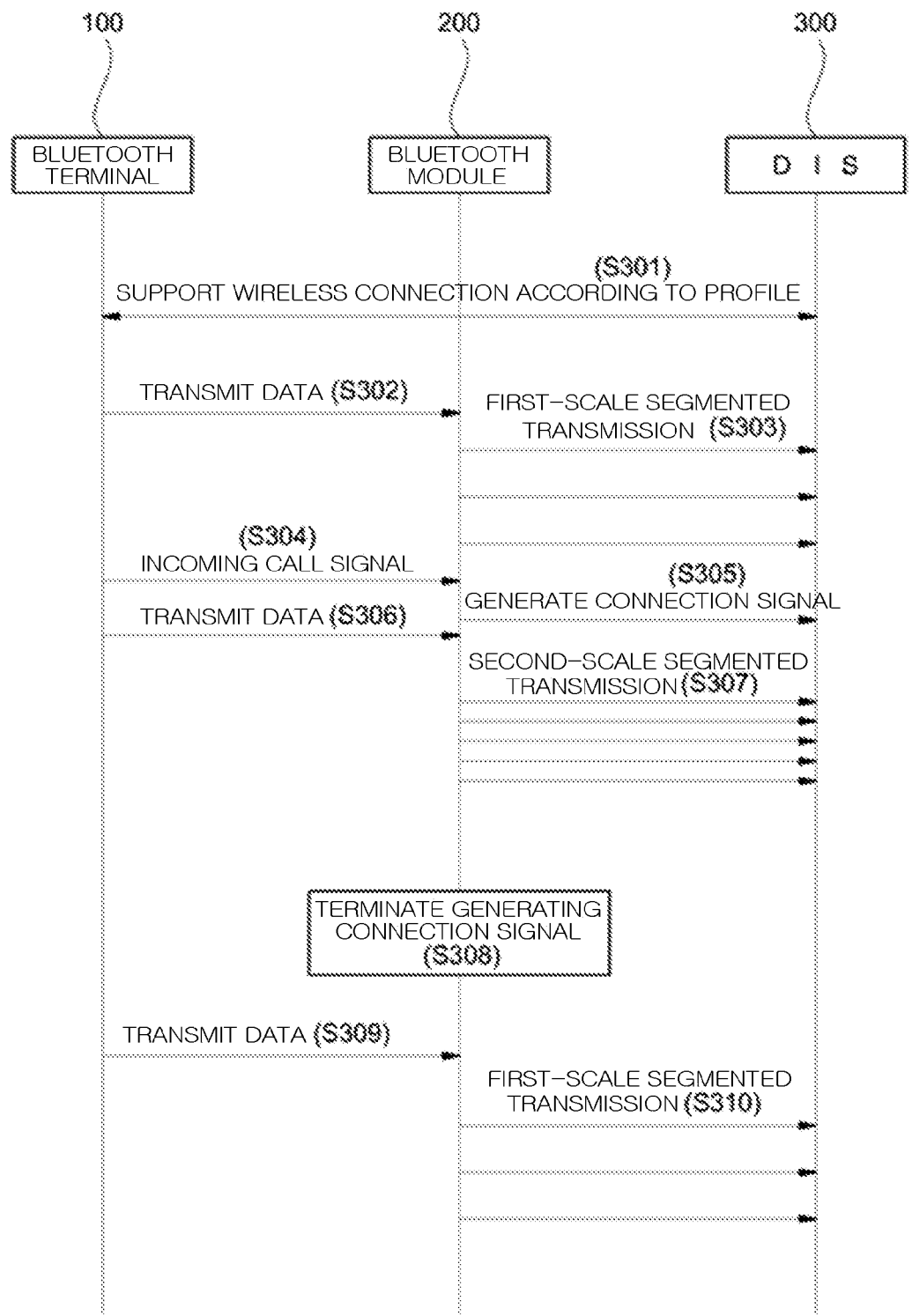
FIG. 3 is a diagram for describing an operation of a communication module according to an embodiment of the present invention.

FIG. 3 is a diagram for describing an operation of the communication module according to an embodiment of the present invention.

Referring to FIG. 3, the communication unit of the communication module supports a wireless connection with the communication terminal according to a profile provided by the communication terminal (S301).

The communication terminal transmits data to the communication module according to a profile supported in connection thereof. In the case of conforming to SPP, the data may be various texts, images, and acoustic data, and in the case of conforming to PBAP, the data may be phone book data (S302).

The communication module segments the data transmitted from the communication terminal based on a first scale, and transmits the segmented data to the DIS (S303).

The communication module outputs a connection signal to the DIS upon receiving an incoming call signal from the communication terminal during the transmitting of data (S304 and S305).

After that, the communication terminal keeps continuously transmitting data to the communication module according to the previous profile, and the communication module segments the data based on a second scale and transmits the segmented data to the DIS (S306 and S307).

The communication terminal keeps transmitting data based on the second scale during an interval in which the connection signal is generated, and from a point of time when the generation of the connection signal is terminated, the communication terminal segments and transmits data based on the first scale again (S308 to S310).

As is apparent from the above, the communication module according to the present invention and the data segmentation transmission method using the same can perform a data communication between a communication terminal and a driver information system (DIS) according to a profile provided by the communication terminal, and perform a data segmentation transmission to prevent distortion of a connection signal when the communication module receives an incoming call signal.

The term of "unit" used in the embodiment of the present invention may be a software component or a hardware component such as Field Programmable Gate Array (FPGA) or Application Specific Integrated Circuit (ASIC), and may implement its own function. Also, components and "units" may be implemented to run one or more CPUs in a device or a security data card.

Although an exemplary embodiment of the present invention has been described for illustrative purposes, those skilled in the art will appreciate that various modifications, changes and substitutions are possible, without departing from the scope and spirit of the invention.

What is claimed is:

1. A communication module comprising:
   a communication unit configured to support a wireless connection with a communication terminal;

a control unit configured to segment data received from the communication terminal and to transmit the segmented data to a driver information system (DIS); and a signal generation unit configured to, upon receiving an interrupt signal from the communication terminal, generate a connection signal to the DIS, wherein the control unit segments the data based on a first scale during a first interval in which the connection signal is not generated, and wherein the control unit segments the data based on a second scale during a second interval in which the connection signal is generated, wherein the second scale is smaller than the first scale.

2. The communication module of claim 1, wherein the interrupt signal includes an incoming call signal.

3. The communication module of claim 2, wherein the control unit segments an entire data packet, which is being transmitted at a point of time of receiving the incoming call signal, based on the second scale, and transmits the segmented data packet to the DIS.

4. The communication module of claim 2, wherein the connection signal is a ring tone.

5. The communication module of claim 1, wherein the communication unit supports a wireless connection with the communication terminal according to a profile provided by the communication terminal.

6. The communication module of claim 5, wherein a relation in size between the first scale and the second scale is set according to at least one of a type of the profile, a size of data, and a type of data.

7. The communication module of claim 5, wherein the profile includes at least one of HFP (Hands Free Profile), A2DP (Advanced Audio Distribution Profile), AVRCP (Audio Video Remote Control Profile), PBAP (Phone Book Access Profile), and SPP (Serial Port Profile).

8. The communication module of claim 7, wherein the control unit receives at least one of a text, an image, and acoustic data from the communication terminal according the SPP, and segments and transmit the received at least one of a text, an image, and acoustic data to the DIS.

9. The communication module of claim 7, wherein the control unit receives phone book data from the communication terminal according to the PBAP, and segments and transmits the received phone book data to the DIS.

10. The communication module of claim 1, wherein the signal generation unit generates a connection signal to the DIS by using at least one of a PCM interface, an I2S interface, and an analog interface.

11. The communication module of claim 1, wherein the communication unit supports a wireless connection with the communication terminal by using at least one communication mode of Bluetooth, ZigBee, ISA-100, and WirelessHART.

12. The communication module of claim 1, wherein the control unit resizes the second scale according to a degree of distortion of the connection signal.

13. The communication module of claim 1, wherein the control unit resizes the second scale to be smaller in proportion to a degree of distortion of the connection signal.

14. A data segmentation transmission method performed by a communication module, the method comprising:

supporting a wireless connection with a communication terminal;

by a control unit, segmenting data received from the communication terminal based on a first scale during a first interval in which a connection signal is not generated;

transmitting the segmented data based on the first scale to a driver information system (DIS);

by a signal generation unit, upon receiving an interrupt signal from the communication terminal, generating the connection signal to the DIS; and by the control unit, segmenting the data received from the communication terminal based on a second scale during a second interval in which the connection signal is generated, and transmitting the segmented data based on the second scale to the DIS.

15. The data segmentation transmission method of claim 14, further comprising: by the control unit, segmenting data, which is received at a point of time when the generation of the connection signal is terminated, based on the first scale, and transmitting the segmented data to the DIS.

16. A driver information system (DIS) installed in a vehicle and configured to perform a network function with a communication terminal, which comprises a communication module comprising:

a communication unit configured to support a wireless connection with the communication terminal; a control unit configured to segment data, which is received from the communication terminal supported in connection thereof, based on a first scale, and to transmit the segmented data to the DIS; and a signal generation unit configured to, upon receiving an interrupt signal from the communication terminal, generate a connection signal to the DIS, wherein the control unit segments data, which is received from the communication terminal during an interval in which the connection signal is generated, based on a second scale, and stores the segmented data.

17. The DIS of claim 16, wherein the second scale is smaller than the first scale.

18. The DIS of claim 16, wherein the control unit segments an entire data packet, which is being transmitted at a point of time of receiving an incoming call signal, based on the second scale, and transmits the segmented data packet to the DIS.

19. The DIS of claim 16, wherein the communication unit supports a wireless connection with the communication terminal according to a profile provided by the communication terminal.

20. The DIS of claim 19, wherein a relation in size between the first scale and the second scale is set according to at least one of a type of the profile, a size of data, and a type of data.

* * * * *